(12) United States Patent
Bishop

(10) Patent No.: US 6,189,721 B1
(45) Date of Patent: Feb. 20, 2001

(54) SPILL CONTAINMENT APRON

(76) Inventor: Merrill E. Bishop, 1363 Wimbledon Way, Charlottesville, VA (US) 22901

( * ) Notice: Under 35 U.S.C. 154(b), the term of this patent shall be extended for 0 days.

(21) Appl. No.: 09/349,545

(22) Filed: Jul. 8, 1999

(51) Int. Cl.[7] .................................................. B65D 1/34
(52) U.S. Cl. ......................................... 220/573; 220/571
(58) Field of Search ................................... 220/573, 571; 184/106; 141/86

(56) References Cited

U.S. PATENT DOCUMENTS

| | | |
|---|---|---|
| 4,707,969 | 11/1987 | Marino . |
| 4,936,418 | 6/1990 | Clausen . |
| 5,090,588 | 2/1992 | Van Romer et al. . |
| 5,099,872 | 3/1992 | Tarvin et al. . |
| 5,316,175 | 5/1994 | Van Romer . |
| 5,339,872 | 8/1994 | Marino . |
| 5,417,310 * | 5/1995 | Halseth ................................. 184/106 |
| 5,435,458 | 7/1995 | Bishop . |
| 5,501,290 * | 3/1996 | Volz et al. .......................... 180/69.1 |
| 5,526,900 * | 6/1996 | Mason ................................. 184/106 |
| 5,775,869 | 7/1998 | Bishop . |
| 5,967,200 * | 10/1999 | Hall ....................................... 141/86 |
| 5,975,332 * | 11/1999 | Bishop ................................. 220/571 |

OTHER PUBLICATIONS

ILC Dover, "New Spill Control Products from ILC Dover," promotional material, date unknown, ILC Dover: Frederica, Deleware.
Emergency Water Diverter by Sulmac, Inc., Plant Services Magazine, p. 54, Sep., 1999.

* cited by examiner

Primary Examiner—Stephen Castellano
(74) Attorney, Agent, or Firm—Rankin, Hill, Porter & Clark LLP

(57) ABSTRACT

A spill containment apron is made of a fluid-impervious sheet that forms a receptacle from which side flaps and end flaps extend. A plurality of straps having hook and loop fasteners at each end are passed under the sheet and extend on either side thereof. A plurality of magnets are included as part of the side flaps and end flaps. A drain valve is provided for the bottom of the receptacle. A pair of dams are disposed in the receptacle near the ends thereof. The apron can be folded compactly for storage and transportation, but can be unfolded quickly and attached easily to a leaking container such as a railroad tank car. The straps, magnets, and dams cooperate to minimize or prevent spillage of the contents of the receptacle.

22 Claims, 2 Drawing Sheets

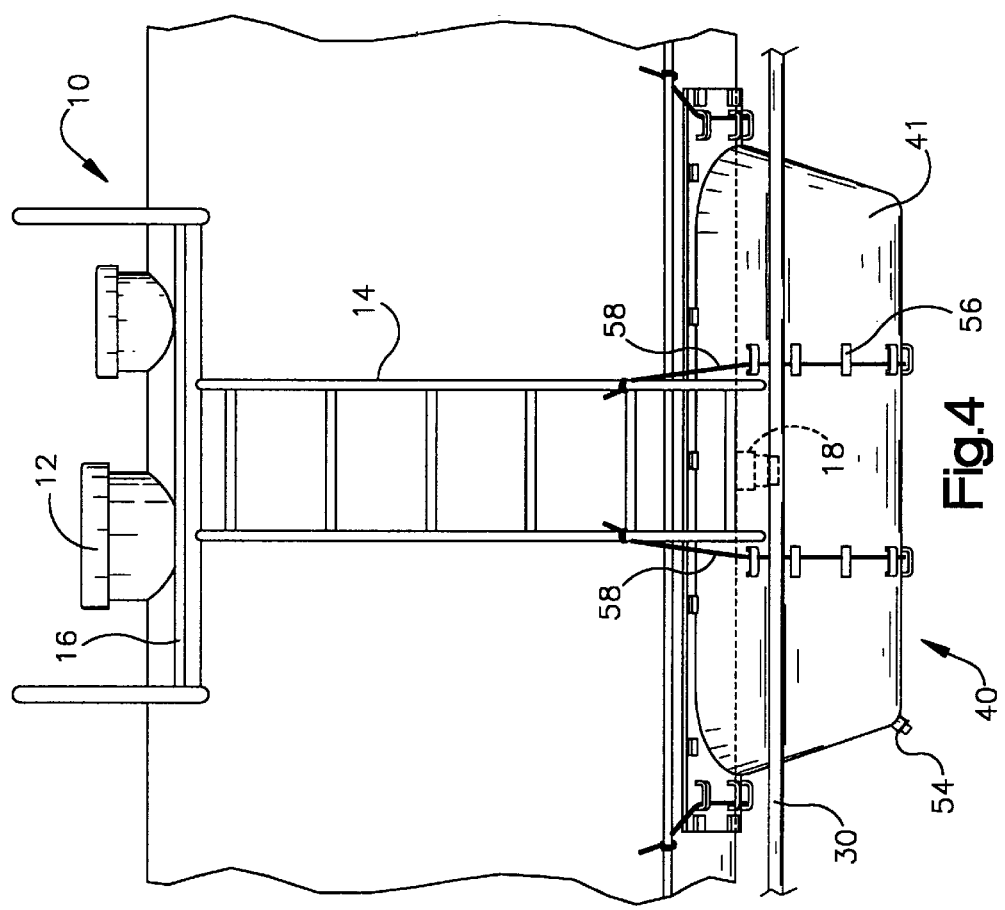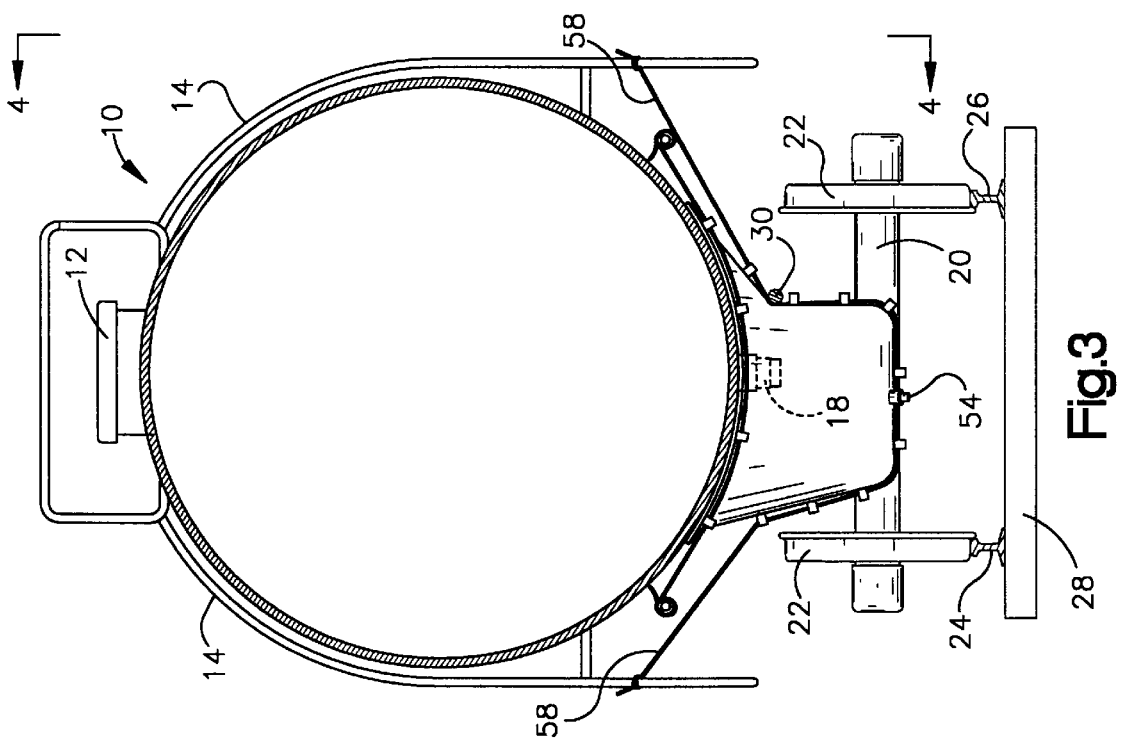

SPILL CONTAINMENT APRON

BACKGROUND OF THE INVENTION

1. Field of the Invention

The invention relates to containment techniques for preventing the undesirable discharge of chemical materials onto the ground and, more particularly, to a containment apron that can be positioned conveniently beneath a railroad tank car or other vehicle or container so as to collect any inadvertent spills or leaks.

2. Description of the Prior Art

Traditionally, railroad tank car loading and unloading has been relatively unregulated. In the past, railroad sidings reflected that lack of concern because they had no provision to collect accidental discharges of whatever was being loaded and unloaded. Often the commodity being shipped was inexpensive or perceived to be of little environmental impact, and therefore any spills were either hosed down or just left for the next rain to clear away. With the advent of stiff fines and high soil remediation costs, techniques to capture these accidental releases and prevent spills or eliminate adverse environmental consequences have become both financially important and of primary interest to the health and safety of the community.

Since spills most often occur during a loading or unloading operation while a railroad tank car is stationary, relatively large, stationary spill containment pans have been developed to collect and possibly economically reuse spilled chemicals. Examples of such spill containment pans are disclosed in U.S. Pat. No. 5,435,458 and U.S. Ser. No. 08/727,964, both invented by Merrill E. Bishop. A transportable spill containment pan is disclosed in U.S. Pat. No. 5,775,869, also invented by Merrill E. Bishop. The latter device enables spills to be collected at locations other than at fixed sidings where permanent spill containment pans may be provided.

Prior efforts to collect leaking, dripping and spilled materials, particularly oily materials, have included providing a flexible plastic drop cloth or sheet which forms a barrier to prevent contact of the oily material with the ground. The plastic sheet can be suspended or mounted to the underside of an automobile, as in U.S. Pat. No. 4,935,418. Alternatively, a spill containment bag can be attached to a tanker truck or railroad tank car as disclosed in U.S. Pat. Nos. 4,707,969 and 5,339,872. Such products have been advertised by ILC Dover of Frederica, Del. under the trademarks SPILL SAVER, FUEL SAVER, AND DRIP CATCHER.

While certain of the referenced devices presumably could be attached to a leaking tank truck or railroad tank car, the devices fail to address certain problems. Often, it is necessary or desirable in the interest of public safety and health to move a leaking tank truck or railroad tank car to a more remote location where the leak can be repaired. The referenced devices are not suitable for use with a vehicle that must be moved due to interference with the ground or portions of the vehicle. Even if movement of the vehicle were possible, at least a portion of any collected liquid would be released from the device due to wave action that would occur upon movement of the vehicle itself or movement of the emergency spill containment.

Desirably, a spill containment apparatus for use with railroad tank cars or other liquid-containing vehicles would be compact and lightweight for purposes of transportation, but would be able to be reconfigured on site and attached to the vehicle to provide an adequate collection volume beneath the vehicle. Preferably, any such device would be able to be quickly and easily attached to the vehicle, would be able to collect a large amount of liquid, would permit the vehicle to be moved while leaking liquid is being collected, and would prevent liquid from being discharged from the device while vehicle movement is occurring. Further, any such device would be able to be emptied easily without danger of spilling its contents or exposing workers to dangerous contact with the collected liquid or bulk material.

SUMMARY OF THE INVENTION

In response to the forgoing and other concerns, the present invention provides a new and improved spill containment apron especially adapted for use with railroad tank cars and other movable vehicles. The spill containment apron according to the present invention is in the form of a fluid-impervious sheet that defines a relatively large, shallow receptacle. The invention includes a pair of opposed end flaps and a pair of opposed side flaps that extend from the receptacle along the upper edges of the receptacle.

A plurality of straps are passed under the sheet and extend outwardly thereof. In the preferred embodiment, the straps are held in place by loops that are secured to the outer surface of the sheet. A drain valve is included as part of the receptacle. A plurality of magnets are included as part of the end flaps and side flaps. The invention includes dams that prevent or minimize liquid in the receptacle from being discharged from the receptacle while the vehicle is in motion. Preferably, all of the components of the device according to the invention will be made of materials that resist the attack of harsh chemicals such as acids or solvents.

The foregoing and further features and advantages of the invention will be apparent from the description and claims that follow, taken in conjunction with the accompanying drawings.

BRIEF DESCRIPTION OF THE DRAWINGS

FIG. 3 is a cross-sectional view of the railroad tank car of FIG. 1 taken along a plane indicated by line 3—3 in FIG. 1; and FIG. 4 is an enlarged side elevational view of a portion of the railroad tank car of FIG. 1 showing the spill containment apron according to the invention attached thereto.

DESCRIPTION OF THE PREFERRED EMBODIMENT

Figure 1:
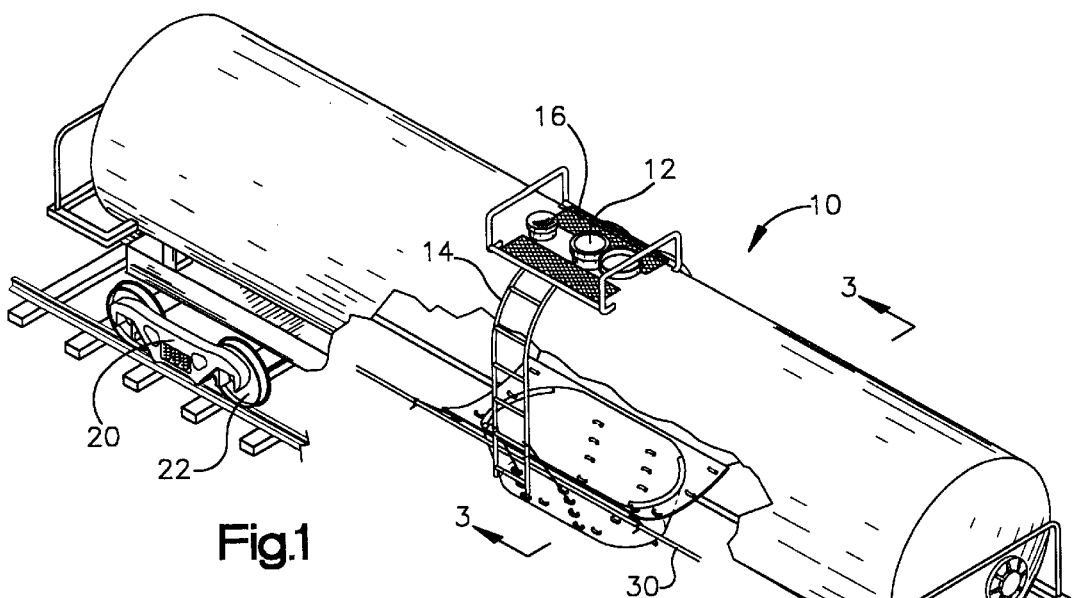
FIG. 1 is a perspective view of a railroad tank car to which a spill containment apron according to the present invention is attached.

Referring to the Figures, a railroad tank car is indicated by the reference numeral 10. The tank car 10 includes a top opening 12 through which chemicals can be loaded into the tank car 10. The top opening 12 is accessible by way of permanently mounted ladders 14 that are connected to a superstructure 16. The tank car 10 includes a bottom valve 18 through which chemicals can be unloaded from the tank car 10 through a hose (not shown). As is conventional, the tank car 10 includes trucks 20 having wheels 22. The wheels 22 ride upon parallel rails 24, 26 which are secured to ties 28. A mechanical brake linkage tie rod 30 runs the full length of the tank car 10. The tie rod 30 activates parking brakes for the wheels 22. The tie rod 30 is spaced about six inches to one side of the bottom valve 18.

A spill containment apron according to the invention is indicated generally by the reference numeral 40. The apron 40 is made of a fluid-impervious sheet 41 that has a bottom wall 42, opposed sidewalls 44, and opposed endwalls 46. Together, the bottom wall 42, the sidewalls 44, and the endwalls 46 define a receptacle 48 within which leaking chemicals can be collected. A pair of opposed side flaps 50 extend from the upper periphery of the sidewalls 44. A pair of opposed end flaps 52 extend from the upper periphery of the endwalls 46.

Preferably, the sheet 41 is of unitary construction in order to eliminate seams. A suitable material for the sheet 41 is fiber-reinforced polypropylene or polyethylene about 0.035 inch thick. In plan view, the apron 40 is generally rectangular, or ellipsoidal, such that it will fit between the spaced, parallel rails 24, 26. The bottom wall 42 is disposed above the level of the ties 28 and the rails 24, 26 a distance adequate to permit movement of the tank car 10 from place to place. The receptacle 48 holds about 50 gallons and has an average length of about five feet, an average width of about 2½ feet, and an average depth of about 1½ feet.

A drain valve 54 is fitted into the bottom wall 42 to enable the receptacle 48 to be drained or pumped dry through suitable piping (not shown). The drain valve 54 is a ¾ inch full port ball valve made of polypropylene. The drain valve 54 includes a handle (not shown) that fully opens or closes the valve within one-quarter turn. The valve 54 has a ¾ inch NPT female outlet fitting for convenient connection to drain piping, if desired.

The sheet 41 has an inner surface that comes into contact with leaking liquids and an outer surface that usually does not. A plurality of loops 56 are secured to the outer surface by any suitable technique such as ultrasonic welding or gluing. A plurality of straps 58 are passed through the loops 56. The straps 58 extend laterally from one side of the sheet 41 to the other and are long enough to extend beyond the side flaps 50 a distance of about eight feet. In total, the straps 58 are about 25 feet long. The ends of the straps 58 are provided with hook and loop fasteners on either side. The hook and loop fasteners extend for a distance of about seven feet from each end of each strap 58. The straps 58 are made are made of a strong, flexible material that will resist chemical attack, such as polyester webbing. Suitable dimensions for the straps 58 are ⅛ inch thick and one inch wide.

The side flaps 50 and the end flaps 52 form a continuous surface at the upper end of the receptacle 48. The flaps 50, 52 are provided with magnets 60 on the outer surfaces thereof. The magnets 60 are spaced at intervals about the periphery of the sheet 41. The magnets 60 must be very strong in order to attach the flaps 50, 52 securely to the underside of the tank car 10. The magnets 60 also must resist chemical attack. The magnets 60 are about ⅜ inch thick, ⅞ inch wide, and about 1⅞ inch long, and are commercially available under the designation T-40 ceramic type 5.

The receptacle 48 is provided with at least one dam 62 to break up wave surges upon starting and stopping of the tank car 10. In the preferred embodiment, two dams 62 are provided, one at each end of the receptacle 48. The dams 62 are in the form of two-inch diameter closed cell polyethylene tubes about three or four feet long that are glued or otherwise securely attached to the upper portion of the receptacle 48 near the end flaps 52. Another suitable material for the dams 62 is so-called "backer rod" that is used in the construction industry.

Operation

Figure 2:
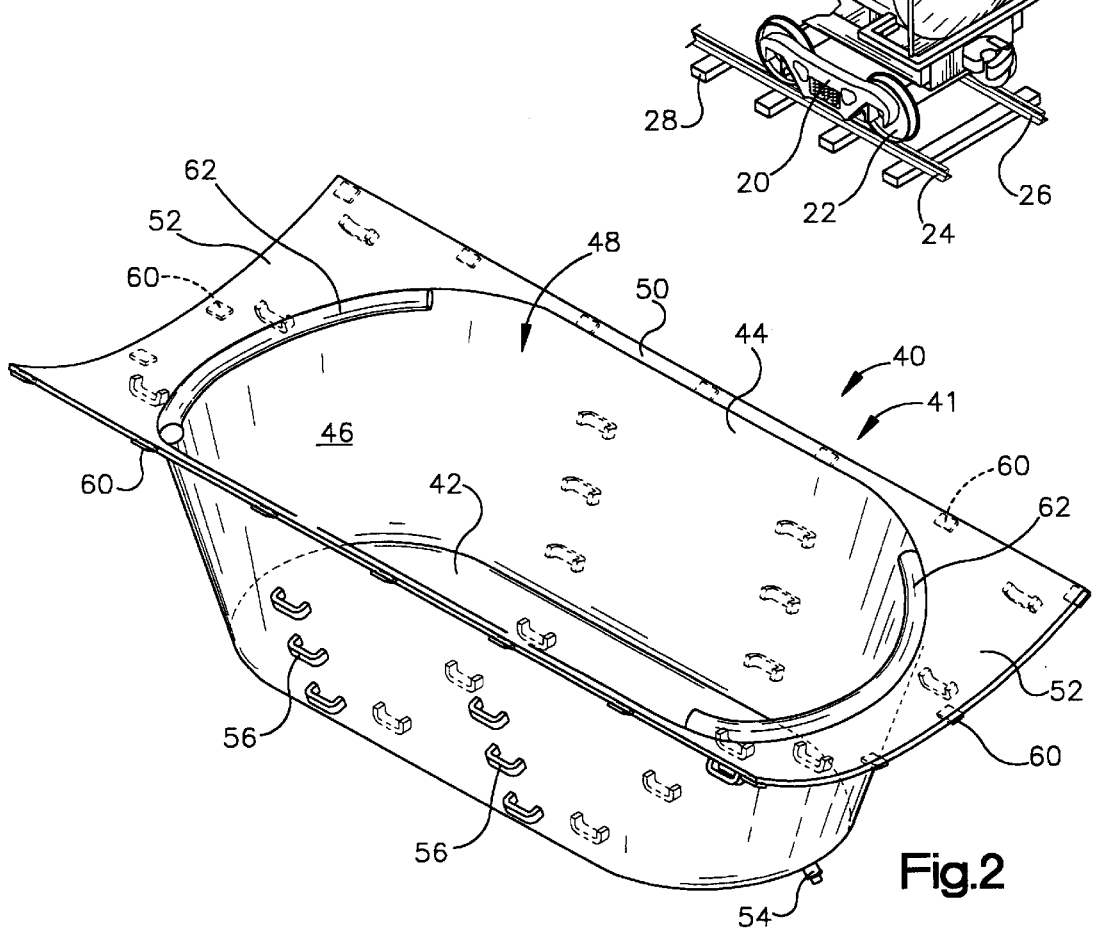
FIG. 2 is a perspective view of the spill containment apron according to the invention in an expanded position.

When the apron 40 is not being used, it can be folded into a compact shape for convenient storage and transportation. When the apron 40 is needed to collect leaking material, the sheet 41 is unfolded to that position shown in FIG. 2 (the straps 58 can be passed through the loops 56 either before the sheet 41 is folded for storage or after it has been unfolded for use). The sheet 41 is arranged relative to the tank car 10 so that the tie rod 30 is not covered (FIGS. 3 and 4). The straps 58 are connected to any available portion of the tank car 10 such as the ladders 14. The magnets 60 assist in holding the sheet 41 in proper position while the straps 58 are being connected to the tank car 10. In order to make certain that the straps 58 will be able to support the weight of a loaded receptacle 48, the ends of the straps 58 should be tied in a knot such as a half hitch or a girth hitch prior to being secured with the hook and loop fasteners.

When the apron 40 has been connected to the tank car 10 such as shown in FIGS. 1, 3, and 4, the flaps 50, 52 are attached to the tank car 10 by the magnets 60 to provide a loose seal for the receptacle 48. The flaps 50, 52, in combination with the dams 62, prevent or minimize chemicals contained within the receptacle 48 from being spilled when the tank car 10 is being moved from place to place. After the tank car 10 has arrived at a repair facility, the drain valve 54 can be used to conveniently and safely empty the receptacle 48. Because the various components of the apron 40 are relatively inexpensive and likely will have been exposed to strong chemicals, it is expected that a used apron 40 will be disposed of and replaced with a new one. It is possible, however, for the apron 40 to be cleaned for reuse a number of times, if desired.

As will be apparent from the foregoing description, the present invention provides an effective technique for collecting chemicals that are leaking from railroad tank cars or tanker trucks. The invention is compact, lightweight, and capable of being stored and transported conveniently. While the invention is especially effective when used with railroad tank cars, it also can be used effectively with other movable liquid-carrying containers such as over-the-road tank trucks or with stationary containers.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A spill containment apron, comprising:
   a fluid-impervious sheet having opposed inner and outer surfaces that define a receptacle, a plurality of loops seed to the outer surface of the sheet, end flaps that extend from the opposite ends of the receptacle, and side flaps that extend from the opposite sides of the receptacle;
   a plurality of straps in engagement with the outer surface of the sheet, the straps passing through the loops, under the receptacle and extending outwardly therefrom; and
   a drain valve included as part of the receptacle.

2. The spill containment apron of claim 1, further comprising magnets attached to the end flaps and the side flaps about the periphery of the sheet.

3. The spill containment apron of claim 2, wherein the magnets are ceramic magnets.

4. The spill containment apron of claim 1, wherein the sheet is made of a material selected from the group consisting of fiber-reinforced polypropylene and polyethylene.

5. The spill containment apron of claim 1, wherein the straps are made of polyester webbing.

6. The spill containment apron of claim 1, wherein the ends of the straps are provided with hook and loop fasteners that permit the ends of the straps to be folded back upon themselves and retained in place.

7. The spill containment apron of claim 1, wherein the loops are secured to the outer surface by ultrasonic welding or gluing.

8. The spill containment apron of claim 1, wherein the drain valve is a polypropylene ball valve.

9. The spill containment apron of claim 1, wherein the receptacle is about five feet long, about 2½ feet wide, and about 1½ feet deep.

10. The spill containment apron of claim 1, wherein the receptacle is sized to hold approximately 50 gallons.

11. The spill containment apron of claim 1, further comprising a dam disposed within the receptacle.

12. The spill containment apron of claim 11, wherein two dams are provided, one dam being secured to the inner surface of the sheet adjacent the upper portion of the receptacle near a selected one of the end flaps, and the other dam being secured to the inner surface of the sheet adjacent the upper portion of the receptacle near the other end flap.

13. The spill containment apron of claim 11, wherein the dam is a closed cell polyethylene tube.

14. A spill containment apron, comprising:

a fluid-impervious sheet made of a material selected from the group consisting of fiber-reinforced polypropylene and polyethylene having opposed inner and outer surfaces that generally define a receptacle, end flaps that extend from the opposite ends of the receptacle, side flaps that extend from the opposite sides of the receptacle, and a plurality of loops connected to the outer surface;

a plurality of straps passing through the loops and extending outwardly from the sheet, the ends of the straps being provided with hook and loop fasteners that permit the ends of the straps to be folded back upon themselves and retained in place;

a drain valve included as part of the receptacle;

magnets attached to the end flaps and the side flaps; and a pair of dams, one dam being secured to the inner surface of the sheet adjacent the upper portion of the receptacle near a selected one of the end flaps, and the other dam being secured to the inner surface of the sheet adjacent the upper portion of the receptacle near the other end flap.

15. The spill containment apron of claim 14, wherein:

the receptacle has an average length of about five feet, an average width of about 2½ feet, and an average depth of about 1½ feet;

the straps are made of polyester webbing;

the drain valve is a polyethylene ball valve;

the magnets are ceramic magnets; and the dams are in the form of closed cell polyethylene tubes.

16. A spill containment apron, comprising:

a fluid-impervious sheet having opposed inner and outer surfaces that define a receptacle, end flaps that extend from the opposite ends of the receptacle, and side flaps that extend from the opposite sides of the receptacle;

a plurality of straps in engagement with the outer surface of the sheet, the straps passing under the receptacle and extending outwardly therefrom, the ends of the straps being provided with hook and loop fasteners that permit the ends of the straps to be folded back upon themselves and retained in place; and a drain valve included as part of the receptacle.

17. A spill containment apron, comprising:

a fluid-impervious sheet having opposed inner and outer surfaces that define a receptacle, end flaps that extend from the opposite ends of the receptacle, and side flaps that extend from the opposite sides of the receptacle;

a plurality of straps in engagement with the outer surface of the sheet, the straps passing under the receptacle and extending outwardly therefrom;

a drain valve included as part of the receptacle; and a plurality of magnets attached to the end flaps and the side flaps about the periphery of the sheet.

18. The spill containment apron of claim 17, wherein the magnets are ceramic magnets.

19. A spill containment apron, comprising:

a fluid-impervious sheet having opposed inner and outer surfaces that define a receptacle, end flaps that extend from the opposite ends of the receptacle, and side flaps that extend from the opposite sides of the receptacle;

a plurality of straps in engagement with the outer surface of the sheet, the straps passing under the receptacle and extending outwardly therefrom; and a drain valve in the form of a polypropylene ball valve included as part of the receptacle.

20. A spill containment apron, comprising:

a fluid-impervious sheet having opposed inner and outer surfaces that define a receptacle, end flaps that extend from the opposite ends of the receptacle, and side flaps that extend from the opposite sides of the receptacle;

a plurality of straps in engagement with the outer surface of the sheet, the straps passing under the receptacle and extending outwardly therefrom;

a drain valve included as part of the receptacle; and a dam disposed within the receptacle.

21. The spill containment apron of claim 20, wherein two dams are provided, one dam being secured to the inner surface of the sheet adjacent the upper portion of the receptacle near a selected one of the end flaps, and the other dam being secured to the inner surface of the sheet adjacent the upper portion of the receptacle near the other end flap.

22. The spill containment apron of claim 20, wherein the dam is a closed cell polyethylene tube.

* * * * *

UNITED STATES PATENT AND TRADEMARK OFFICE
CERTIFICATE OF CORRECTION

PATENT NO.   : 6,189,721 B1  
DATED        : February 20, 2001  
INVENTOR(S)  : Merril E. Bishop Page 1 of 1

It is certified that error appears in the above-identified patent and that said Letters Patent is hereby corrected as shown below:

Column 4,
Line 52, "seed" should be -- secured --

Signed and Sealed this

Twenty-seventh Day of November, 2001

Attest:

NICHOLAS P. GODICI
Attesting Officer  Acting Director of the United States Patent and Trademark Office